United States Patent

Mahr et al.

[11] Patent Number: 5,911,034
[45] Date of Patent: Jun. 8, 1999

[54] METHOD AND CIRCUIT FOR PRODUCING SYNCHRONOUS CONTROL SIGNALS IN VIDEO RECORDERS

[75] Inventors: Peter Mahr, Königsfeld; Gerhard Reiner, Villingen-Schwenningen, both of Germany

[73] Assignee: Deutsche Thomson-Brandt GmbH, Villingen-Schwennigen, Germany

[21] Appl. No.: 08/648,809

[22] Filed: Oct. 9, 1996

[30] Foreign Application Priority Data

Nov. 2, 1995 [DE] Germany .......................... 195 40 752

[51] Int. Cl.[6] .............................. H04N 5/926; H04N 7/52
[52] U.S. Cl. .................................. 386/124; 386/1; 386/90; 360/64; 360/75
[58] Field of Search .................................. 386/1, 46, 76, 386/124, 90; 360/61, 64, 75, 78.02; H04N 5/926, 7/52

[56] References Cited

U.S. PATENT DOCUMENTS

| | | | |
|---|---|---|---|
| 4,843,493 | 6/1989 | Furuhata et al. | 360/77.15 |
| 4,935,826 | 6/1990 | Sin et al. | 360/70 |
| 4,959,733 | 9/1990 | Miura et al. | 358/338 |
| 5,142,420 | 8/1992 | Tanaka et al. | 360/32 |
| 5,357,382 | 10/1994 | Lee | 360/64 |
| 5,448,367 | 9/1995 | Park et al. | 358/323 |
| 5,629,812 | 5/1997 | Kleinhuis | 360/64 |
| 5,745,314 | 4/1998 | Ikeda et al. | 360/51 |

FOREIGN PATENT DOCUMENTS

| | | | |
|---|---|---|---|
| 4107729 | 9/1992 | Germany | H03K 3/64 |

*Primary Examiner*—Wendy Garber
*Assistant Examiner*—Vincent F. Boccio
*Attorney, Agent, or Firm*—Joseph S. Tripoli; Frederick A. Wein; Daniel E. Sragow

[57] ABSTRACT

In order to produce synchronous control signals of a video recorder, in particular of a digital video recorder, a position pulse of the scanner motor, which coincides with the beginning of the video frame, is used as time zero point. Time markers in which changes in the control signals take place are calculated starting from this time zero point. These time markers and the bit patterns occurring at these time markers are stored as data words in a data field and, for corresponding time markers, the corresponding data word is output in parallel, that is to say synchronously. A realization is possible by means of a microcontroller and a controllable output memory, the microcontroller containing the functions of capture register, timer, calculation unit and comparator.

13 Claims, 3 Drawing Sheets

METHOD AND CIRCUIT FOR PRODUCING SYNCHRONOUS CONTROL SIGNALS IN VIDEO RECORDERS

The invention relates to a method and to an apparatus for producing synchronous digital control signals in video recorders, in particular in digital video recorders.

BACKGROUND OF THE INVENTION

The servo system of known digital video recorders has a sophisticated clock control circuit, since control signals with precisely defined timing are required for coordination or coupling between the motor control, for switching the head amplifiers and for data exchange between the codec and the servo system. In order to define control signals of this type, a sensor supplies a position pulse PU, which forms the basis for the synchronization of the control signals, with every revolution of the scanner motor or of the head drum. Among other things, this position pulse PU of the scanner motor is used to carry out the synchronization with the incoming video pictures or video frames. Desired boundary conditions for the control signals in this case are freedom from jitter, synchronism, programmable phase offset and low real-time loading of the controller.

In order to fulfil the desired basic and special functions of a video recorder, in particular of a digital video recorder, it is at least necessary to make available and produce the following switching pulses:

- a head switching signal HS1 for switching over head 1 and head 2, which is offset by 180°,
- a head switching signal HS2 for switching over head 3 and head 4, which is offset by 180°,
- a record/play changeover signal, and
- a synchronous track signal for alternative tracking control by means of the longitudinal track.

Both SD and HD recorders require flexible, controllable head switching signals, for example HS1 and HS2, which define the writing and reading range. In the case of four-head systems, the small spacing between the double heads of about 550 μm means that a very small time interval between the two edges of the head switching signals must be possible, and with the said head spacing, this interval is approximately 55 μs. In order to comply with the specifications defined in the digital video codec standard (DVC standard), it is also necessary to set the beginning of writing with reference to the tape edge. In this case, it is possible to compensate for the mechanical tolerances by means of a programmable time delay between the sensor for producing the PU signal, which sensor is fitted on the head drum, and the switching-on edge of the head switching signal. This can both be achieved by a manual adjustment operation and be done automatically by means of a microcomputer or microcontroller. By evaluating specific information items on the tape and their temporal assignment, a time delay value is determined which normalizes the mechanical conditions of the respective device and thus meets the required DVC standard.

The record/play signal is likewise to be changed over synchronously in time with the beginning of the track or the beginning of the frame (beginning of the picture). In various special operating modes, such as assemble editing, caption editing and audio dubbing, data must be read and inserted at quite specific points on a track of the video tape. With reference to the beginning of the track, it is therefore necessary to produce a writing window which has precise timing and controls the writing of data.

SUMMARY OF THE INVENTION

The invention is therefore based on the object of providing a method and an apparatus in which synchronous control signals with precise timing are produced.

The present invention relates to a method for producing digital synchronous control pulses for a video recorder, in particular a digital video recorder, the method having the following steps:

a) detection of a position pulse PU of the scanner motor or of the head drum, which pulse is used for the definition of a time zero point to and determines the revolution period of the scanner motor and thus of the head drum, b) calculation of the time markers $t_1, t_2, \ldots t_n$ of the control pulses, which are required for the following period, and of the bit patterns of the control signals for the corresponding time markers, c) storage of the time markers $t_1$–$t_n$ and of the bit patterns belonging to the corresponding time markers, d) parallel output of the corresponding bit pattern with the arrival of a corresponding time marker.

In general, the time zero point $t_0$ coincides with the beginning of a video frame.

A time marker is the designation for an instant at which one or more of the generally square-wave control signals change their level. Accordingly, there is a respective bit pattern, which contains the levels of the individual signals, for a time marker. This bit pattern of a time marker $t_1, \ldots t_n$ is stored as a data word having a width of k bits, where k represents the number of signals, that is to say the number of control lines when considered in terms of circuitry.

These data words, whose number is equal to the number n of time markers, are stored as a data field, that is to say as a k×n matrix.

Furthermore, the data word of the time marker $t_i$ is loaded into a controllable output memory once the preceding time marker $t_{i-1}$ has passed, which memory effects the output of the data word for the precise time marker $t_i$, where $1 \leq i \leq n$. In other words, the data field is output in columns according to the preceding matrix definition.

Furthermore, the invention includes a circuit for carrying out the method, having a microcontroller and a controllable output memory, the microcontroller having the functional blocks of capture register, timer, calculation unit and comparator. In this case, the capture register serves to receive the position pulse PU, the timer serves to determine the time which has elapsed since the instant $t_0$, the timer being triggered by the position pulse PU, and the comparator compares the desired value of the time marker supplied by the calculation unit with the time which has actually elapsed since $t_0$ and is made available by the timer, with the result that, in the event of identity, the controllable output memory, which has loaded the data word, to be output, from the calculation unit, outputs the said data word.

The controllable output memory is advantageously realized by a latch. To trigger the latch, a flip-flop for producing a strobe pulse is arranged between the latch and the comparator of the circuit according to the invention, the set input of which flip-flop is driven by the comparator and the reset input of which flip-flop is driven by the calculation unit 5.

In a preferred embodiment, the data word, to be output, of a time marker is passed via a serial bus from the calculation unit into a serial/parallel converter, which conditions the data for the latch.

The serial/parallel converter and the latch can advantageously be formed by a programmable logic device, designated as PLD below, the data word, to be output, of a time marker being clocked into the PLD by means of the clock input and data input of the PLD and being loaded into the output latch 10 of the PLD by means of a strobe pulse and being output.

Furthermore, once the data word of a time marker has been output by the latch of the PLD, the next data word to be output can be read serially into the PLD, with the result that the PLD is prepared for the output of the data word. In other words, immediately after the data word of the time marker $t_{i-1}$ has been output, the data word of the time marker $t_i$ is loaded into the PLD, with the result that the data word can be output when the time marker $t_i$ arrives.

Finally, the PLD in the circuit according to the invention can additionally be used as a programmable capstan-FG divider.

The advantages of the method according to the invention and of the circuit reside in rapid production of the various synchronous control signals, jitter-free output of time-critical pulses, a cost-effective hardware and software solution in respect of the pin allocation and the microcontroller processing time, and simple adaptation to different servo systems, head configurations, revolution speeds of the head drum or the like.

BRIEF DESCRIPTION OF THE DRAWING

A preferred embodiment of the method and of the circuit is explained with reference to the following figures, in which.

DETAILED DESCRIPTION

Figure 1:
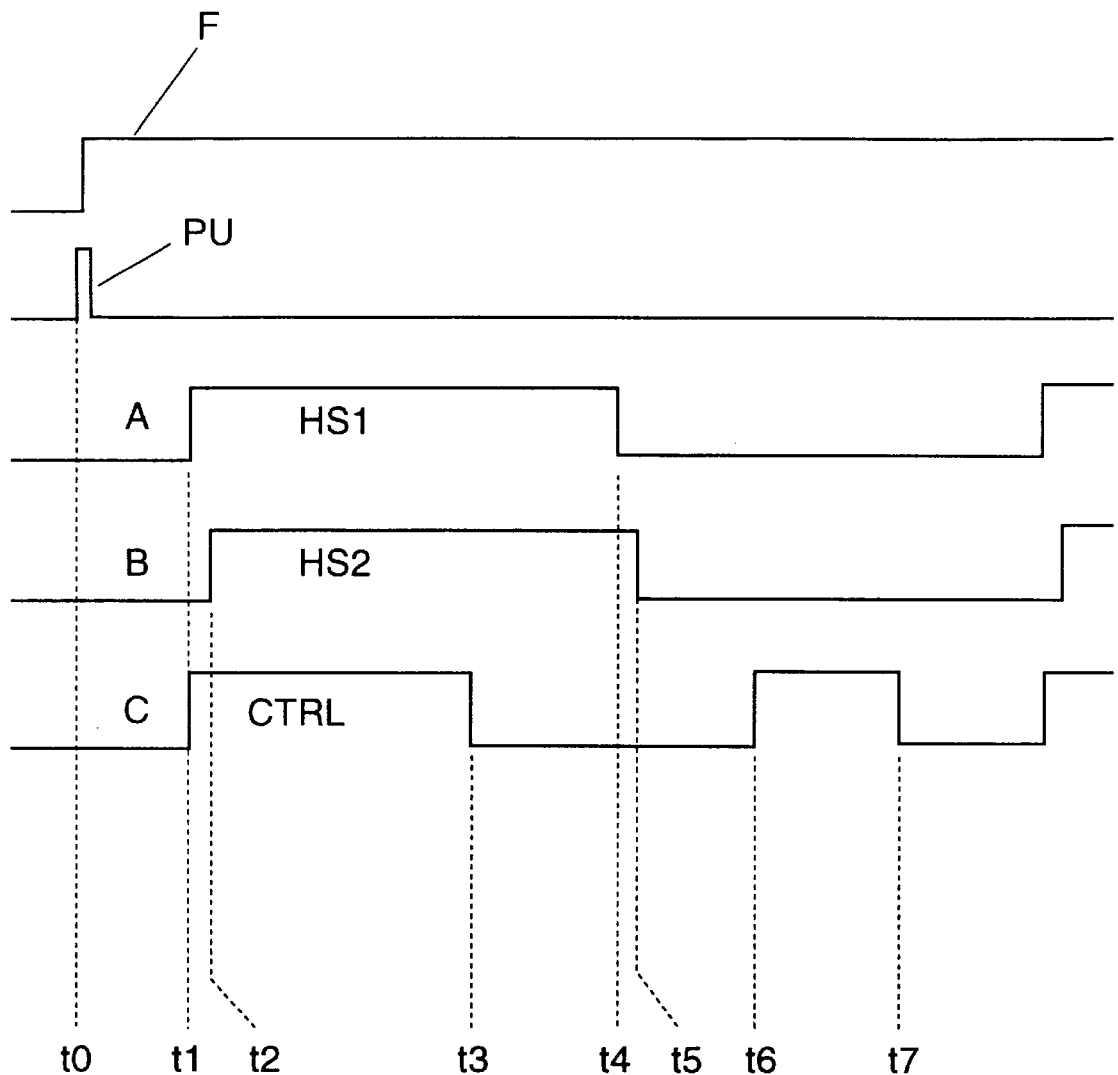
FIG. 1 shows timing diagrams of essential signals in the upper part and shows the time markers with the associated data field in the lower part.

FIG. 1 shows, by way of example, the timing diagrams of five essential signals in the upper part, the top diagram representing the video or frame signal F, the second diagram shows the position signal PU which is supplied by the scanner motor and defines the instant $t_0$, that is to say the time zero point, which is synchronous with the frame signal F. The output signals illustrated in the third, fourth and fifth diagrams are designated by A, B and C, the channel A representing the head switching signal HS1, the channel B representing the head switching signal HS2 and the channel C representing a control signal CTRL. As is evident from the diagrams, the rising edge of the head switching signal HS1, which rising edge is synchronous with the control signal CTRL, defines a time marker $t_1$, the rising edge of the second head switching signal HS2, which rising edge, when using double heads, is shifted in time by 55 µs on account of the head spacing, defines a time marker $t_2$, the end of the control signal CTRL defines a time marker $t_3$, the end of the first head switching signal HS1 defines a time marker $t_4$, the falling edge of the second head switching signal HS2 defines a time marker $t_5$, the rising edge of the control signal CTRL defines a further time marker $t_6$ and the associated falling edge of the second control signal CTRL defines a further time marker $t_7$. The number n=7 is in this case to be understood as being only by way of example, another, in particular higher, number is possible.

The lower part of FIG. 1 illustrates a data field which is assigned to the time markers and, corresponding to the three control channels A, B, C, consists of data words which have a width of 3 bits and are arranged one behind the other corresponding to the time markers $t_1$ to in this case $t_7$, with the result that a look-up matrix or a look-up table is formed which in this case is processed in columns. From the assignment of the timing diagrams to the time markers $t_1$ to $t_7$, it becomes clear that the time marker $t_1$ is associated with the bit pattern 101, the time marker $t_2$ is associated with the bit pattern 111, the time marker $t_3$ is associated with the bit pattern 110, the time marker $t_4$ is associated with the bit pattern 010, the time marker $t_5$ is associated with the bit pattern 000, the time marker $t_6$ is associated with the bit pattern 001 and the time marker $t_7$ is associated with the bit patterns 000, the bits being assigned from left to right to the control channels A, B, C. In the present case, the bit of the channel A can be defined as the least significant bit (LSB) and the channel C as the most significant bit (MSB), this assignment being arbitrary and depending on the application.

The algorithm for creating the look-up table or the data field calculates, starting from a time zero point $t_0$ which is defined by the arrival of the position pulse PU, the time markers $t_1$ to $t_7$, in the general case $t_1$ to $t_n$, where n is a natural number corresponding to the number of required time markers, in which a changeover of the control pulse has to occur on one of the control lines. The bit pattern calculated in this way is stored in the data field and placed onto the signal lines, in this case A, B, C, with the arrival of the time marker.

Figure 2:
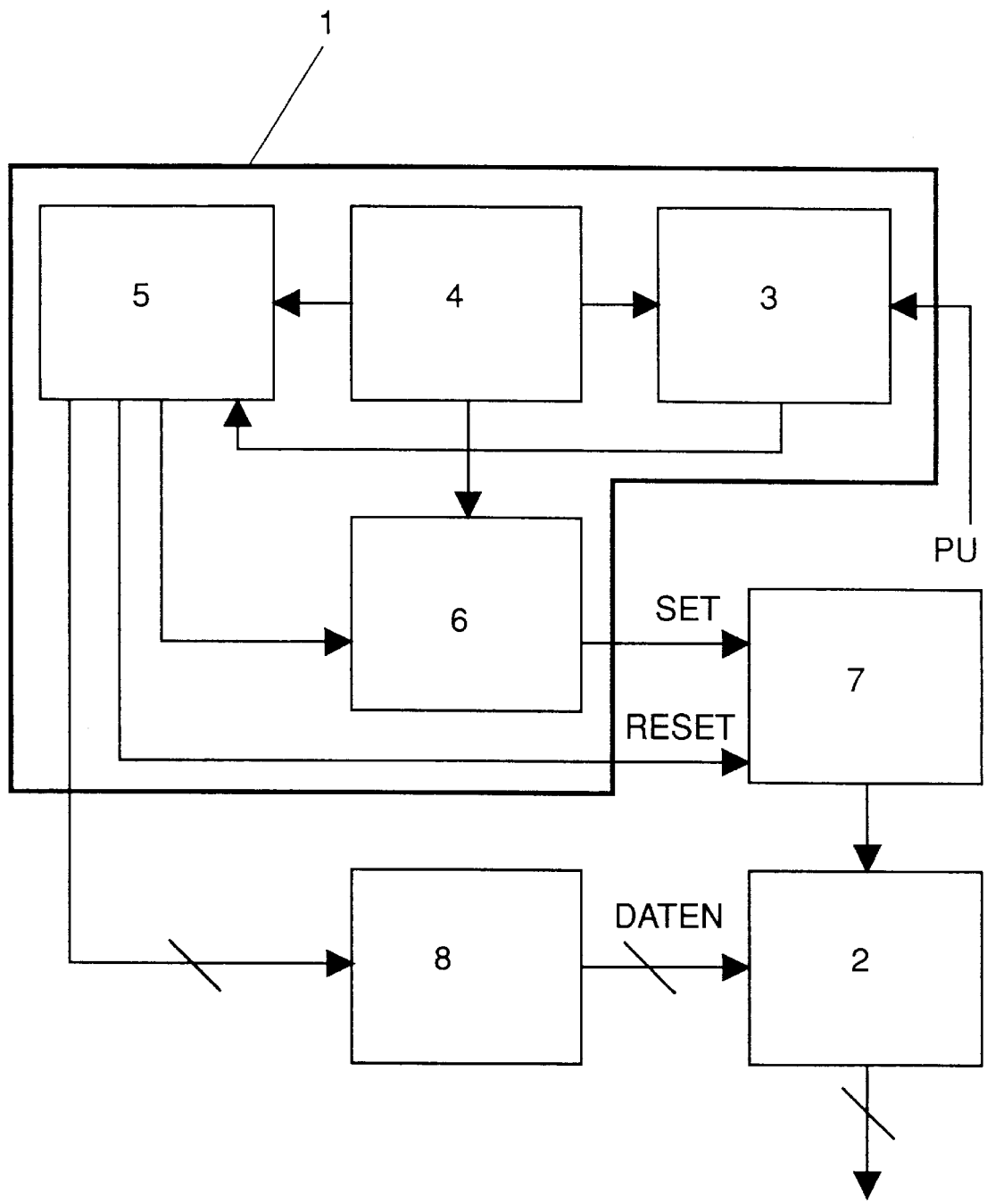
FIG. 2 shows an inventive circuit for carrying out the method.

FIG. 2 shows the realization of the method according to FIG. 1 in terms of circuitry. The circuit in this case essentially consists of a microcontroller 1 and a controllable output memory 2, which in the present case is realized by an eight-fold latch 2. The microcontroller 1 realizes or includes the functions of a capture register 3, a timer 4 having a width of 16 bits, a calculation unit 5 with an appropriate main memory (not illustrated) and a comparator 6. The circuit functions as follows: with the input of the position pulse PU, which indicates the location of the head drum, into the capture register 3, the time zero point is defined, and with this input of the pulse PU, the calculation unit 5 calculates the necessary time markers and stores them in a data field. The timer 4 is triggered by the input of the position pulse PU and passes its ACTUAL value to a comparator 6. The comparator 6, which can be formed by a compare register of the microcontroller 1, receives as desired value the next time marker calculated by the calculation unit 5. In the event of identity between the actual and desired values in the comparator 6, a pulse is passed to the set input of a flip-flop 7, which in response produces a strobe pulse and outputs it to the latch 2. The latch 2 contains the data, to be output, of the corresponding time marker which has been loaded before the arrival of the time marker via a serial/parallel converter 8 from the calculation unit 5. With the arrival of the strobe signal at the latch 2, the latter then outputs in parallel the data used as switching or control signals, with the result that exact synchronization of these signals is provided.

In the preferred embodiment, the connection between the calculation unit 5 and the serial/parallel converter 8 is designed as a two-wire bus. The connection between the converter 8 and the latch 2 is of parallel design, in this case 8 bits wide.

Figure 3:
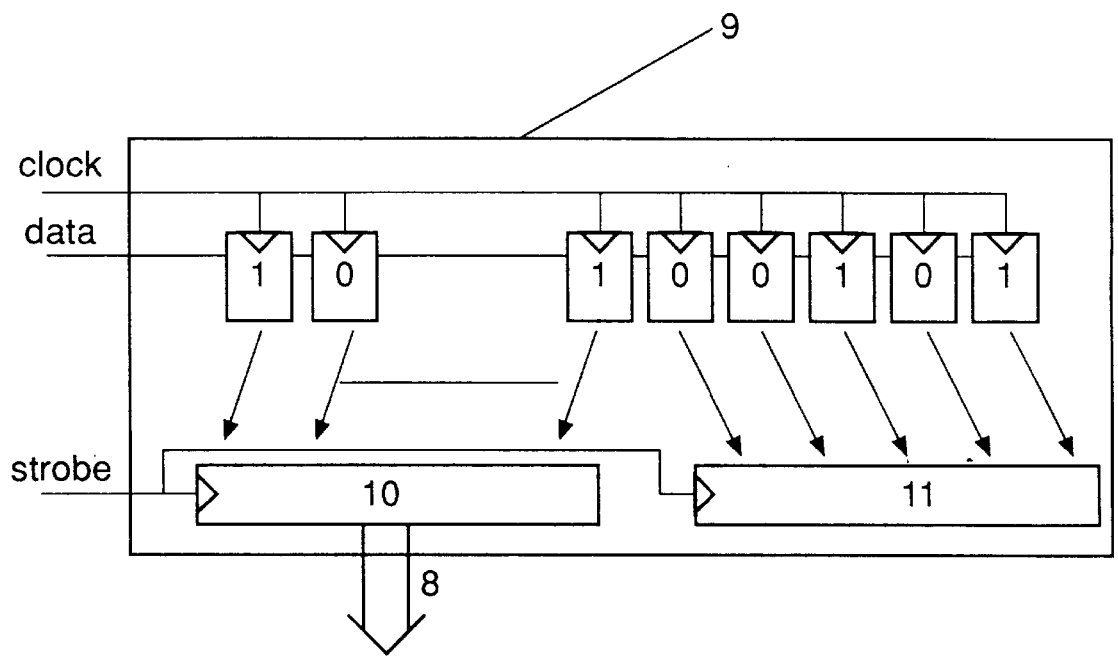
FIG. 3 shows the basic diagram of a programmable logic device PLD used as serial/parallel converter and latch.

FIG. 3 shows the realization of the latch 2 and of the serial/parallel converter 8 in the form of a programmable logic device (PLD). By means of the two lines "data" and "clock", the 8-bit-wide data word and a 5-bit-wide capstan-FG divider value (not explained further here) are clocked serially into the PLD 9 as a composite 13-bit data word from the microcontroller. Although only the provision of three control signals HS1, HS2 and CTRL was explained in FIG. 1, it goes without saying that further parallel control signals can be generated if this is necessary. With the arrival of the strobe signal, the two data word segments are loaded into the two latches 10 and 11 of the PLD 9 and output. Once the control signals have been output via the latch 10 of the PLD 9, it is already possible for the next data word to be output to be read serially into the PLD.

We claim:

1. Method for producing synchronous digital control signals for a video recorder, in particular a digital video recorder, characterized by the following steps:

a) reception of a position pulse (PU) which is used for the definition of a time zero point ($t_0$) and defines a period of a head revolution, b) calculation of all the time markers ($t_1, t_2, \ldots$) of the control signals, which are required for the following period, and of the bit patterns, belonging to a time marker, of the control signals, c) storage of the time markers ($t_1$–$t_n$) and of the bit patterns to be output, d) parallel output of the corresponding bit pattern for the corresponding time marker.

2. Method according to claim 1, characterized in that the time zero point ($t_0$) coincides with the beginning of a video frame (F).

3. Method according to claim 1 characterized in that the bit pattern of a time marker ($t_1, \ldots t_n$) is stored as a data word having a width of k bits.

4. Method according to claim 3, characterized in that the n data words are stored as a data field.

5. Method according to claim 4, characterized in that the data word of the time marker ($t_i$) is loaded into an output memory once the preceding time marker ($t_{i-1}$) has passed, which memory effects the output of the data word with the arrival of the time marker ($t_i$).

6. Method according to one of the preceding claims, characterized in that the position signal (PU) is produced by a sensor on the scanner motor.

7. Circuit for carrying out the method according to claim 1, the circuit comprising a microcontroller (1) and a controllable output memory (2) such that the microcontroller (1) has the functional blocks of capture register (3) for receiving the position pulse (PU), timer (4), calculation unit (5) and comparator (6), the comparator (6) comparing the desired value of the time marker supplied by the calculation unit (5) with the current time marker of the timer (4), with the result that, in the event of identity, the controllable output memory (2), which has loaded the data word, to be output, from the calculation unit (5) outputs the said data word.

8. Circuit according to claim 7, characterized in that the controllable output memory (2) is realized by a latch (2).

9. Circuit according to claim 8, characterized in that a flip-flop (7) for producing a strobe pulse is arranged between the latch (2) and the comparator (6), the set input of which flip-flop is driven by the comparator (6) and the reset input of which flip-flop is driven by the calculation unit (5).

10. Circuit according to claim 9, characterized in that the data word, to be output, of a time marker ($t_i$) is passed via a serial bus from the calculation unit (5) into a serial/parallel converter (8), which conditions the data for the latch (2).

11. Circuit according to claim 10, characterized in that the serial/parallel converter (8) and the latch (2) are formed by a PLD (9), the data word, to be output, of a time marker ($t_i$) being clocked into the PLD (9) by means of the clock input and data input of the PLD (9) and being loaded into an output latch (10) of the PLD (9) by means of a strobe pulse and being output.

12. Circuit according to claim 11, characterized in that once the data word of a time marker ($t_i$) has been output by the latch (10) of the PLD (9), the next data word to be output can be read serially into the PLD (9).

13. Circuit according to either of claims 11 and 12, characterized in that the PLD (9) is additionally used as a programmable capstan transport speed divider.

* * * * *